Nov. 11, 1924.
H. T. BURKEY
ELECTRIC FISH STOP
Filed March 29, 1922
1,515,547
3 Sheets-Sheet 1
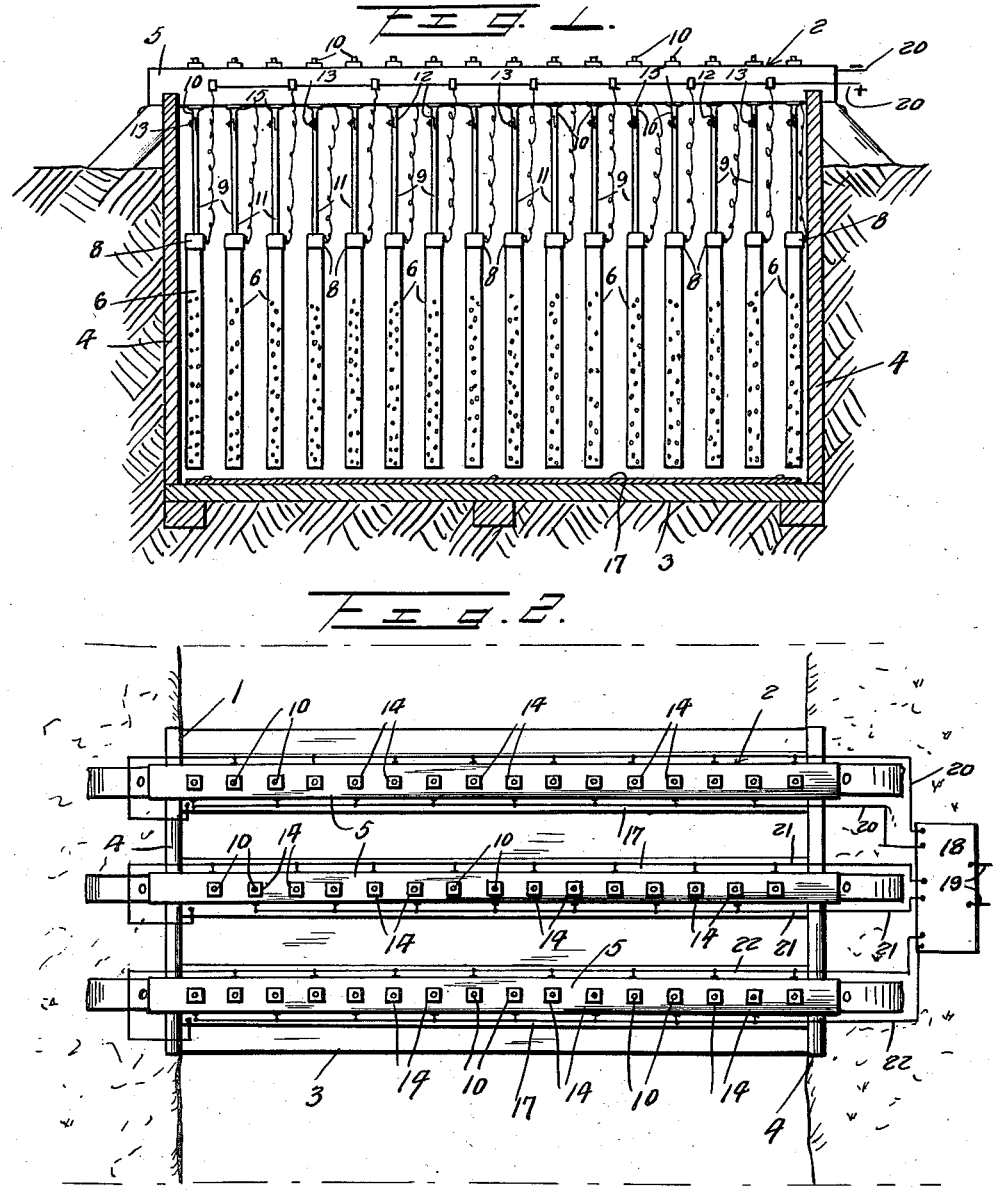
Inventor
H. T. Burkey.

Nov. 11, 1924.
H. T. BURKEY
ELECTRIC FISH STOP
Filed March 29, 1922
1,515,547
3 Sheets-Sheet 2
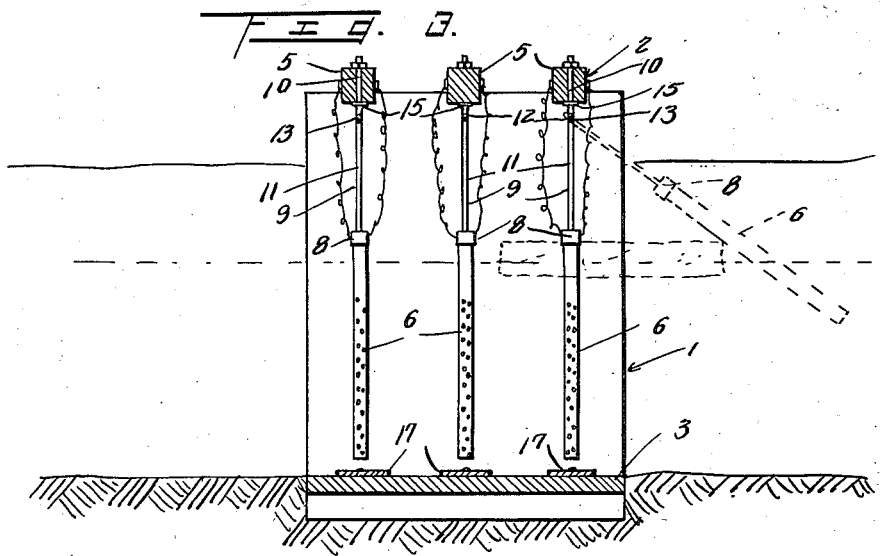
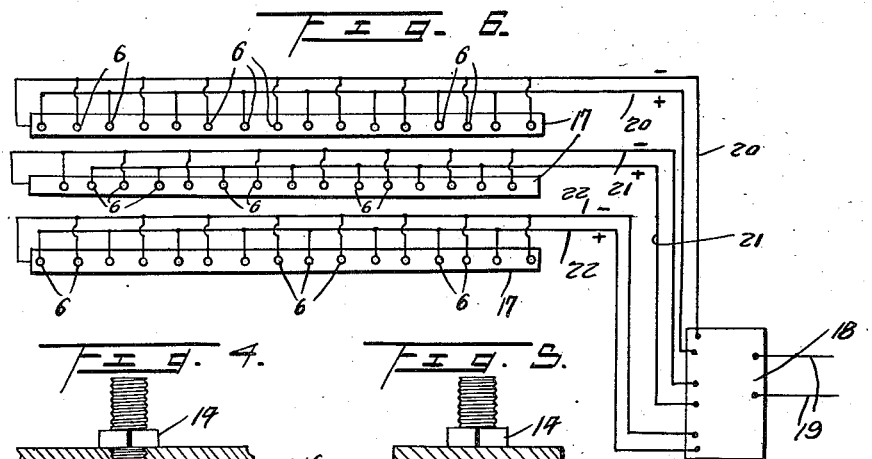
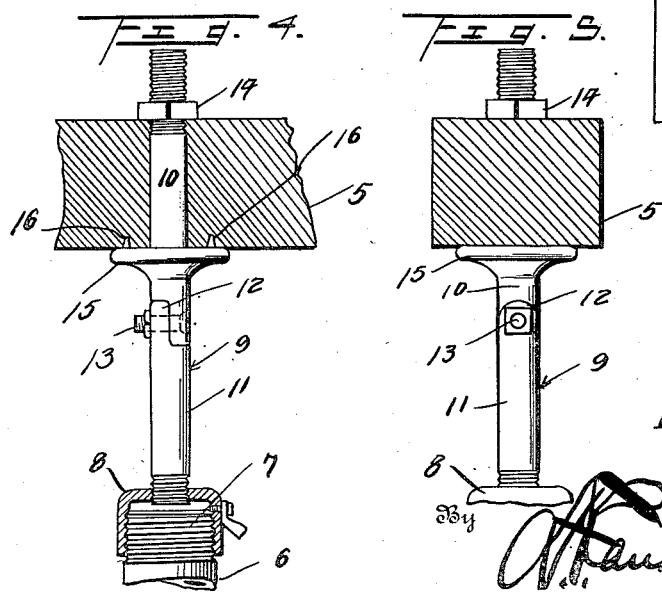
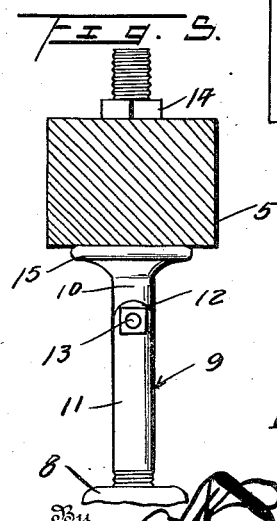
Inventor
H. T. Burkey
By
Attorney

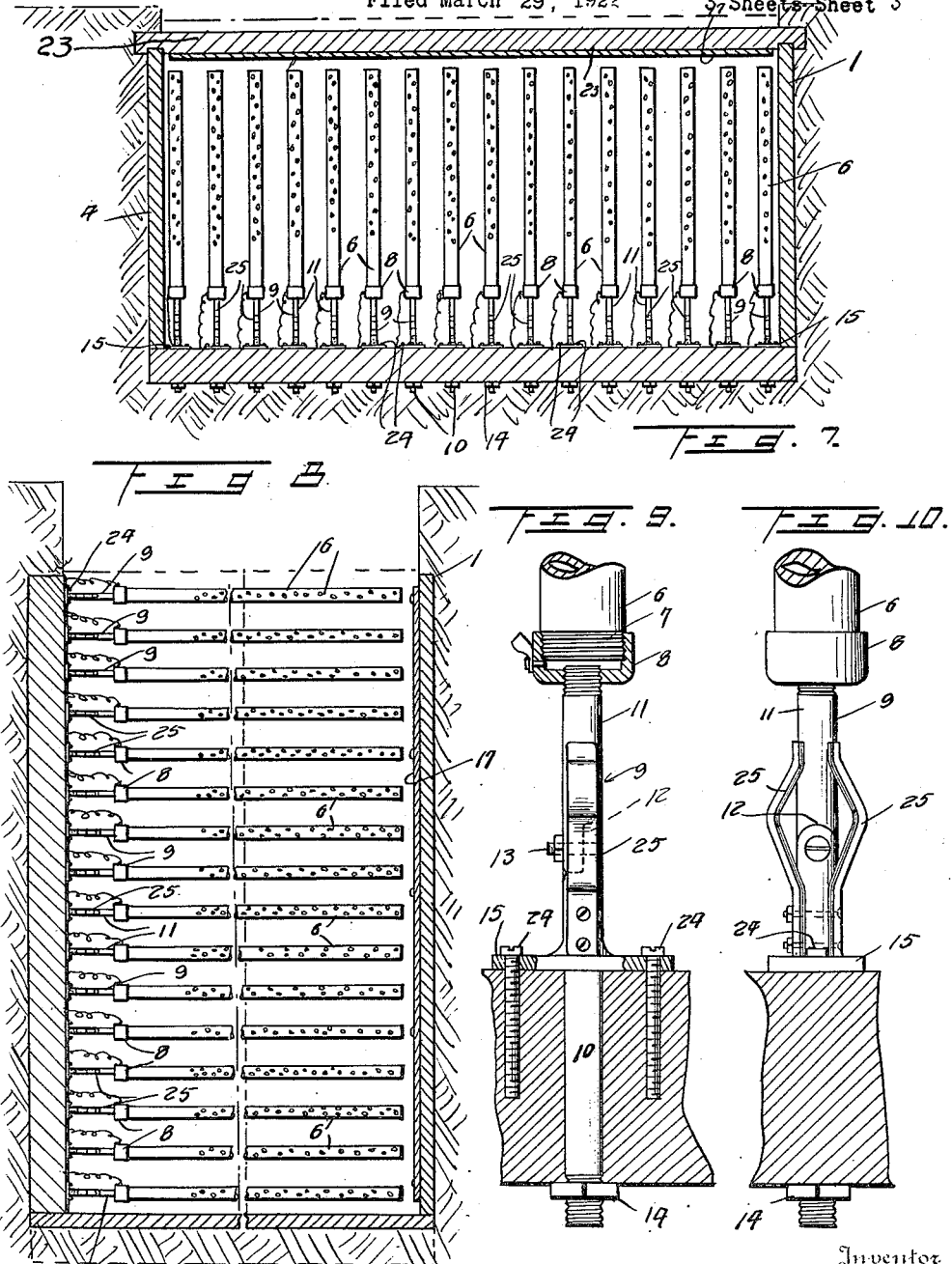

Patented Nov. 11, 1924.

1,515,547

UNITED STATES PATENT OFFICE.

HENRY T. BURKEY, OF TULSA, OKLAHOMA.

ELECTRIC FISH STOP.

Application filed March 29, 1922. Serial No. 547,830.

*To all whom it may concern:*

Be it known that I, HENRY T. BURKEY, a citizen of the United States, residing at Tulsa, in the county of Tulsa and State of Oklahoma, have invented certain new and useful Improvements in Electric Fish Stops; and I do hereby declare the following to be a full, clear, and exact description of the invention, such as will enable others skilled in the art to which it appertains to make and use the same.

This invention relates to new and useful improvements in fish stops and has for its primary object to improve the methods and efficiency of such devices by spaced arrangement of electrodes with reference to each other and to the depth of the section of the stream or body of water in which the fish stop is placed, whereby fish of all sizes found in the water will be turned back and prevented from passing either up or down the stream without liability of injury or killing the fish and without preventing the free passage of water and leaves, grass, trees and other débris which may be carried by the stream.

Another object of this invention is the provision of a fish stop of the above stated character which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a transverse sectional view, illustrating a fish stop constructed in accordance with my invention, Figure 2 is a top plan view, illustrating the same, Figure 3 is a longitudinal sectional view, illustrating in dotted lines the movement of one of the electrodes for the purpose of allowing débris to pass the fish stop.

Figure 4 is a fragmentary sectional view, illustrating a mounting for the depending electrode, Figure 5 is a similar view, taken at right angles to Figure 4, Figure 6 is a diagrammatical view, illustrating the wiring diagram, Figure 7 is a transverse sectional view, illustrating a modified form of my invention, Figure 8 is a similar view, illustrating another modified form of my invention, Figure 9 is a fragmentary sectional view, illustrating a modified form of mounting for the electrode and employed principally in the modified forms of my invention shown in Figures 7 and 8, and Figure 10 is a similar view taken at right angles to Figure 9.

Referring in detail to the drawings, the numeral 1 indicates a trough or sluice constructed from wood or any other material suitable for the purpose and is adapted to be positioned in a stream or any other body of water where it is desired to locate the fish stop 2 for the purpose of preventing fish from passing beyond a given or desired point. The trough 1 includes a bottom 3 and sides 4 that project above the banks of the stream to support or form rests for supporting elements 5 and to position the latter sufficiently far enough from the surface of the water so that débris floating on the surface of the water will not come in contact with said supports 5. The supports 5 are constructed from any material suitable for the purpose and traverse the stream either at right angles thereto or diagonally if desired, and preferably are three in number for the purpose of supporting a corresponding number of series of electrodes 6. Each support 5 carries a series of electrodes 6 that are spaced from each other and from the sides and bottom of the trough or sluice 1 and are preferably of cylindrical shape provided with openings or perforations for the purpose of allowing water to pass therethrough and thereby reduce the resistance, offered by the electrodes, to the passage of water and consequently prevent the electrodes being moved by the flow or current of the stream. The upper ends of the electrodes 6 are screw threaded as shown at 7 and are threaded into collars 8 which have the lower ends of attaching elements 9 threaded thereto. The attaching elements 9 include sections 10 and 11 which have their opposing ends reduced to form overlapping extensions 12 that are connected by pivot bolts 13 so as to form a hinge connection between said sections 10 and 11.

These sections 10 extend through the supports 5 and have their ends screw threaded to receive securing nuts 14. Collars 15 are formed on the sections 10 and engage the lower faces of the supports 5 and are provided with teeth or prongs 16 adapted to bite into the supports 5 to prevent rotation of the attaching elements 9 and also the electrodes relatively to the supports 5, consequently maintaining the hinges between the sections of the attaching elements in proper position to allow the electrodes to swing freely in the direction of the flow of the stream so that when the electrodes are engaged by débris, they will swing upwardly and permit said débris to pass. The supports 5 are so spaced that the series of electrodes are arranged sufficiently far enough apart from each other that when the electrodes of the last series are moved upwardly to permit the passing of débris, as shown in Figure 3, the first series have become disengaged from the débris and returned to their initial or depending position. By having the electrodes so arranged permits débris to pass with the flow of the stream in considerably large quantities without the danger of all of the electrodes of the stop being swung upwardly by being in engagement with the débris.

Bottom electrodes 17 are secured to the bottom 3 of the trough 1 and directly under the depending electrodes 6 and the latter are slightly spaced from the former. The electrodes are so spaced as to permit the use of progressively increasing electrical currents in the parallel rows of electrodes so that the electrical current employed in the first or entrance row of said electrodes is less than the current in the electrodes at the exit or outlet end of the fish stop.

A transformer 18 of any well known construction is employed and is connected to feed wires 19 and also has positive and negative conductors 20, 21 and 22 leading therefrom and the conductors 20 carry the electrical current of the lowest amperage, while the conductors 21 carry the electrical current of a slightly higher amperage, and the conductors 22 carry the electrical current of the highest amperage. The positive and negative conductors 20, 21 and 22 are connected to every other electrode 6 of the three series as shown in Figure 2 so that positive and negative electrodes are arranged adjacent to each other in each series of electrodes of the fish stop to cause the electrical current to charge or electrify the water by the electrical current passing from one electrode to the other. The three bottom electrodes 17 are connected respectively to positive conductors 20, 21 and 22, whereby the electrical current passes therefrom to the negative electrodes of the series of depending electrodes 6. With the use of the transformer 18, it is possible to have the electrical current at the inlet end of the fish stop of a low amperage for the purpose of stopping or turning back small fish and thereby obviate any possible chance of injuring or killing small fish by coming in contact with electrical current of too high amperage. The electrodes being arranged in three series and connected to the transformer, permits electrical currents to be passed through the water of progressively increasing amperage, so that when large fish are not stopped or turned back by the low amperage the intermediate series of electrodes will supply electrical current of sufficient amperage to turn back or stop such sized fish.

In some instances it may be desirable not to employ a trough or sluice in a stream or body of water and in this instance, the supports 5 may be supported in any suitable manner from the banks of the body of water and the bottom electrodes are held in place by weights or anchors on the bed of the stream.

As shown in Figure 7, it may sometimes be desirable to reverse the position of the electrodes 6 and 17 and when this is the case, the electrodes 17 are secured to supports 23 carried by the sides of the sluice or trough 1. The attaching elements 9 of the electrodes 6 are fastened to the bottom of the trough or sluice by extending therethrough and also by having screws or similar fasteners 24 passed through the collars 15 and threaded into the bottom of the trough or sluice. When the electrodes 6 extend upwardly from the bottom of the trough or sluice it is necessary to provide means for retaining them in vertical position and to accomplish this, leaf springs 25 are provided which are firmly attached to the non-movable sections of the attaching members 9 while their other ends bear against the movable sections for the purpose of permitting the movable sections to swing on their hinges in case the electrodes 6 have excessive pressure brought against them, as for instance the débris coming in contact with them while floating with the current of the stream. As soon as the débris becomes disengaged from the electrodes they are returned to their vertical or initial position by the springs 25. It is to be understood that the electrodes 6, when used as shown in Figure 1, return to their initial position by gravity, the electrodes being of sufficient weight to overcome the action of the current of the stream against them.

As shown in Figure 8, it is sometimes desirable to arrange the electrodes 6 longitudinally of the stream and when this is the case, the attachment elements 9 are secured to one of the side walls of the sluice or trough while the electrodes 17 are secured to the other side wall. It is to be understood that when the electrodes are employed in the manner shown in Figure 8, the type of attaching element 19 shown in Figures 9 and 10 is employed.

The electrodes 6 are so designed and constructed as to have sufficient weight to maintain them in vertical or substantially vertical position when suspended from the supports 5. However, the weight of the electrodes 6 may have to be varied according to the velocity of the stream in which they are employed.

While I have shown and described the preferred embodiment of my invention, it will be understood that minor changes in construction, combination and arrangement of parts may be made without departing from the spirit and scope of the invention as claimed.

Having thus described my invention, what I claim is:

1. An electric fish stop comprising a support, a group of electrodes each independently hinged to said support, and a fixed electrode arranged in spaced relation to the free ends of said group of electrodes, and means for electrically charging said electrodes.

2. An electrical fish stop comprising supporting members, attaching elements secured to said supports and each including sections hingedly connected, electrodes connected to the movable sections of the attaching elements, and means for electrically charging said electrodes.

3. An electrical fish stop comprising supporting element, sectional attaching elements having one of their sections secured to said support, hinges connecting the sections of the attaching elements, electrodes detachably secured to the other section, and means for electrically charging said electrodes.

4. A fish stop comprising a support adapted to traverse a stream, attaching elements carried by said support and including sections movably connected, electrodes carried by some of said sections, electrodes secured to the bottom of the trough and extending transversely thereof and in alinement with the first named electrodes and spaced therefrom, and means for electrically charging said electrodes.

5. A fish stop comprising a support, attaching elements including hingedly connected sections, and one of said sections extending through said support, flanges formed on said last section, nuts threaded to said last section and engaging said supports, electrodes carried by said attaching elements, and means for electrically charging said electrodes.

6. An electrical fish stop comprising attaching elements secured at the bottom of the stream and including hingedly connected sections, springs secured to some of said sections and engaging the other of said sections, electrodes secured to the last named sections and supported in vertical position by said springs, and means for electrically charging said electrodes.

7. An electrical fish stop comprising a trough adapted to be positioned within a stream, vertically extending electrodes hingedly connected to the bottom of said trough, means for holding said electrodes in vertical position and capable of permitting them to swing in the direction of the flow of the stream when engaged by débris, and means for electrically charging said electrodes.

8. An electrical fish stop adapted to be positioned within a stream, transversely extending electrodes hingedly mounted at one side of the stream, said electrodes adapted to swing in the direction of the flow of the stream when engaged by débris, tension means for holding and returning the electrodes to their initial position, and means for electrically charging said electrodes.

9. An electric fish stop comprising a plurality of groups of electrodes, the groups being arranged relatively close together and transversely of and in a stream, and the electrodes of each group being movable independently of the electrodes of the remaining groups.

10. An electric fish stop comprising a unit of pivotally mounted electrodes disposed transversely of and in a stream, and means to urge the electrodes to and normally maintain them in a substantially vertical position.

11. An electric fish stop comprising a plurality of groups of electrodes, the groups being disposed transversely of and in a stream and being relatively close together, the electrodes of each group being independently movable, and means to supply electric current of progressively increasing voltage to the successive groups of electrodes.

In testimony whereof I affix my signature in presence of two witnesses.

HENRY T. BURKEY.

Witnesses:
LUTHER M. TAYLOR,
G. H. JOHNSON.